United States Patent
Gerard et al.

(10) Patent No.: US 12,208,755 B2
(45) Date of Patent: Jan. 28, 2025

(54) ELECTRICAL POWER SUPPLY FOR A VEHICLE

(71) Applicant: RENAULT S.A.S, Boulogne Billancourt (FR)

(72) Inventors: David Gerard, Guyancourt (FR); Christophe Ripoll, Guyancourt (FR)

(73) Assignee: AMPERE S.A.S., Boulogne Billancourt (FR)

( * ) Notice: Subject to any disclaimer, the term of this patent is extended or adjusted under 35 U.S.C. 154(b) by 0 days.

(21) Appl. No.: 18/256,808

(22) PCT Filed: Dec. 3, 2021

(86) PCT No.: PCT/EP2021/084277
§ 371 (c)(1),
(2) Date: Jun. 9, 2023

(87) PCT Pub. No.: WO2022/122597
PCT Pub. Date: Jun. 16, 2022

(65) Prior Publication Data
US 2024/0025360 A1    Jan. 25, 2024

(30) Foreign Application Priority Data
Dec. 11, 2020 (FR) ........................... 20 13110

(51) Int. Cl.
*B60R 16/023* (2006.01)
*B60L 50/75* (2019.01)
*B60L 58/40* (2019.01)

(52) U.S. Cl.
CPC .......... *B60R 16/0238* (2013.01); *B60L 50/75* (2019.02); *B60L 58/40* (2019.02)

(58) Field of Classification Search
None
See application file for complete search history.

(56) References Cited

U.S. PATENT DOCUMENTS

| | | | |
|---|---|---|---|
| 2011/0037317 A1* | 2/2011 | Kuschnarew | B60L 50/16 307/9.1 |
| 2018/0019680 A1* | 1/2018 | Nozawa | B60L 50/51 |
| 2021/0229557 A1* | 7/2021 | Breu | B60L 50/70 |

FOREIGN PATENT DOCUMENTS

FR    3 053 851 A1    1/2018

OTHER PUBLICATIONS

International Search Report issued Mar. 25, 2022 in PCT/EP2021/084277, filed on Dec. 3, 2021, 2 pages.
(Continued)

*Primary Examiner* — Jared Fureman
*Assistant Examiner* — Joel Barnett
(74) *Attorney, Agent, or Firm* — Oblon, McClelland, Maier & Neustadt, L.L.P.

(57) ABSTRACT

An electrical power supply for a hybrid or electric motor vehicle includes a first power source to supply a voltage network of the vehicle, a second power source to supply the voltage network of the vehicle and/or to recharge the first power source, and a control module to control a safety structure of the first power source and of the second power source. The electrical power supply includes a metal casing containing the first power source, the second power source, the control module and the safety structure. The safety structure is common to the two power sources.

10 Claims, 3 Drawing Sheets

(56) References Cited

OTHER PUBLICATIONS

Figure 1:
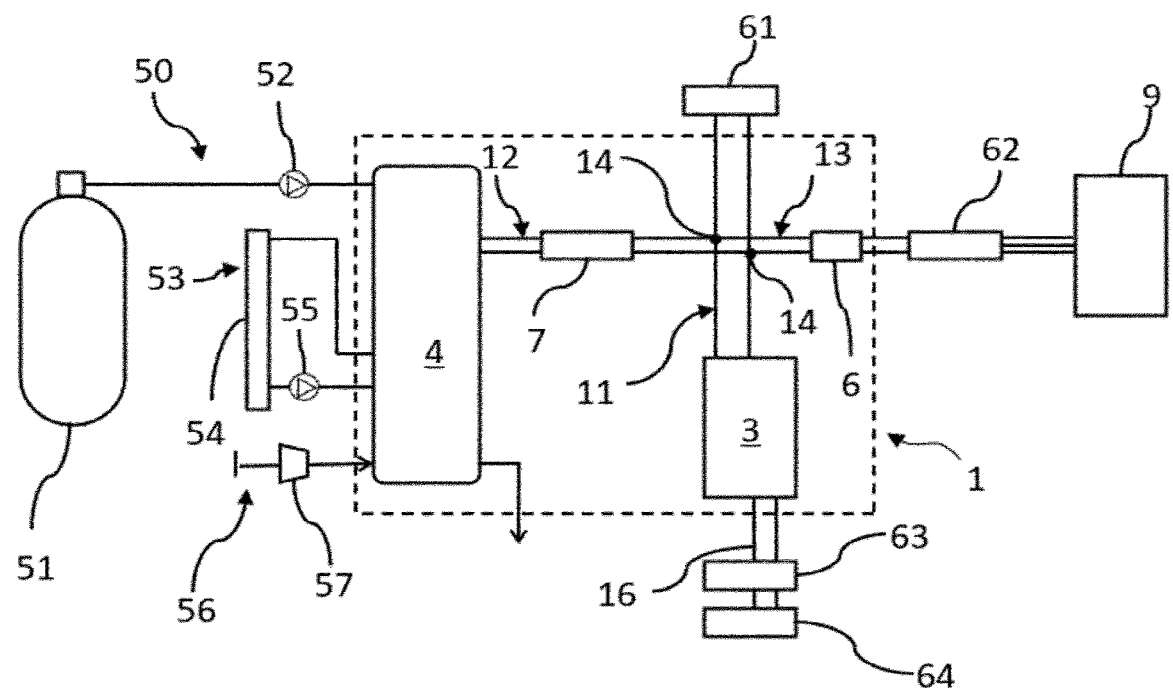

French Preliminary Search Report issued Sep. 10, 2021 in FR application 20 13110, filed on Dec. 11, 2020, 3 pages (With English Translation of Categories of Cited Documents.

* cited by examiner

ELECTRICAL POWER SUPPLY FOR A VEHICLE

The present invention relates to the field of electric powertrains of electric or hybrid motor vehicles, and bears more particularly on an electric power supply device for electric motors.

In electric or hybrid vehicles, the electric motor receives the electric power needed for it to operate in particular from a main battery. One of the issues in the development of electric vehicles is the travel range of the vehicle. One solution contemplated to extend this range is to associate an additional energy source with the main battery, and it is in particular contemplated to associate a fuel cell system with the main battery. The electric motor may thus be supplied with power first and foremost by the main battery and, if necessary, by the fuel cell, when the charge of the main battery is insufficient to continue to do so, in order to increase the range of the vehicle when the battery is completely discharged.

It may therefore be considered that the fuel cell and the main battery are arranged in parallel with one another to allow separate electric power supplies to the electric motor depending on the use case, the electric motor being able to be supplied with power simultaneously by the first energy source formed by the main battery and by the second energy source formed by the fuel cell system.

In such a configuration, in which the fuel cell system should be considered as a range extender, the fuel cell may therefore supply power directly to the electric motor, by supplementing the main battery, and may also, if necessary, contribute to recharging the battery while the vehicle is in motion.

It is known practice, for batteries as well as for fuel cell systems, to provide safety means associated with each power source and which make it possible in particular to cut off the corresponding power source in the event of an intervention on the vehicle. In hybrid or electric motor vehicles, the power sources are specifically able to deliver, in order to be able to provide the electric drive, very large amounts of electrical energy, at high voltage, and any intervention, in the event of an accident or in the event of repair, for example, should systematically begin with an operation of cutting off the electric current. The safety means which make it possible to cut off the electric current in this way may be mechanical means, which are accessible from outside the vehicle if necessary, in particular in the event of an accident and of the power sources not being directly accessible to the response teams, as well as controlled means, which may be triggered by the driver or by a repairer who has access to the vehicle, for example.

The document TWM525304U discloses an electric power supply module for a vehicle, comprising a fuel cell and a battery which are each able to deliver electrical energy to a motor, the module comprising a system for controlling the operation of each of the sources. The module is also configured so that the fuel cell may recharge the battery. The power supply module disclosed in this document is equipped with various relays, among which there are a relay controlled so as to cut off the electrical junction between the fuel cell and the battery, when a risk of the battery being overcharged arises, and a relay controlled so as to cut off the electrical junction between the battery and the motor, the motor being supplied with power via the fuel cell when this second relay is activated. No mention is made in this document of a relay which is able to cut off the electrical junction between the fuel cell and the motor.

The present invention falls within this context and proposes an electric power supply device for an electric or hybrid motor vehicle, comprising a first power source configured to supply power to a voltage network of the vehicle, a second power source configured to supply power to the voltage network of the vehicle and/or recharge the first power source, and a control module configured to control safety means of the first power source and of the second power source, characterized in that the electric power supply device comprises a metal housing containing the first power source, the second power source, the control module and the safety means, said safety means being shared by the two power sources.

By virtue of the power supply device according to the invention, it is therefore possible to interrupt the operation of the two power sources simultaneously, thereby reinforcing the efficacy of the safety of said power supply device. The metal housing makes it possible to centralize and to share the safety means of the power supply device and thus to improve the responsiveness of an intervention causing the first power source and the second power source to be cut off simultaneously.

The first power source as well as the second power source may be used to generate electrical energy providing the drive of the vehicle. This vehicle may be fully electric-drive or indeed hybrid-drive, that is to say it may alternate between drive generated by a heat engine and drive generated by an electric motor. Putting the aforementioned first power source and/or the second power source into operation makes it possible to provide the electric power supply relating to the electric drive. In addition, the first power source may in addition be recharged with electrical energy generated by the operation of the second power source.

The control module is configured to detect one or more data which may be indicative of a malfunction in the electric power supply device and to block the operation of the latter, by controlling the safety means, when such a malfunction is identified, in order to prevent potential damage linked to this malfunction or at least to minimize the impact of said damage on the vehicle.

The metal housing is connected directly to the chassis of the vehicle in order to be connected to earth and thus avoid any inconvenience linked to a potential electric current flowing through the housing and entities which are integrated into the vehicle and may be in contact with the metal housing. The latter is in addition fluid-tight in order to avoid a malfunction occurring within the metal housing propagating outside the latter.

According to one feature of the invention, the electric power supply device comprises a first set of electrical wires which is connected to the first power source and a second set of electrical wires which is connected to the second power source, the first set of electrical wires and the second set of electrical wires being connected to one another at an electrical junction, the electric power supply device comprising a third set of electrical wires which are shared by the two power sources and extend from the electrical junction in the direction of a connector configured to be connected to a voltage network of the vehicle, the safety means being arranged on the third set of electrical wires.

The connector makes it possible to establish an electrical connection between the power sources and the voltage network of the vehicle. The electric current generated by the first power source and/or by the second power source may therefore be transmitted to the voltage network of the vehicle, and in particular provide the electric drive of the vehicle, via this connector.

The first source and the second source are connected to the connector only via this third set of electrical wires, so that the current which is generated by the first source and/or the current which is generated by the second source and intended to supply electric power to the vehicle, via the voltage network and the connector, necessarily flows through this third set of electrical wires.

In other words, the safety means are arranged on the set of electrical wires which are shared by the two power sources, and no current can leave the metal housing via the connector connected to the voltage network of the vehicle if the safety means are implemented to cut off the current.

"Set of electrical wires" should be understood to mean at least a first wire acting as a positive current line and a second wire acting as a neutral or ground, it being understood that any other configuration which makes it possible for electric current to flow between the power sources and an output connector toward a voltage network of the vehicle is covered by the invention as long as some of the electrical wires are shared by the two power sources.

The first set of electrical wires extends between the first power source and the electrical junction, while the second set of electrical wires extends between the second power source and the electrical junction. The third set of electrical wires, which is shared by the two power sources, starts at the electrical junction and extends continuous with the first set and with the second set of electrical wires, respectively.

The electric current generated by the first power source may therefore flow within the first set of electrical wires as far as the electrical junction, then within the third set of electrical wires in order to make it possible to supply power to the high-voltage network of the vehicle.

The electric current generated by the second power source may, for its part, flow within the second set of electrical wires as far as the electrical junction, and the electrical circuit is configured so that this electric current may then flow within the third set of electrical wires when the objective is to supply power to the high-voltage network of the vehicle with the second power source or indeed within the first set of electrical wires in the direction of the first power source when the objective is to recharge the first power source via the second power source.

According to one feature of the invention, the electric power supply device comprises an electric converter installed within the metal housing, the electric converter being connected to the second set of electrical wires and arranged between the second power source and the electrical junction. The electric converter may, for example, be a DC-to-DC converter, and it makes it possible to convert the electrical energy generated by the second power source into electrical energy at an intensity and a voltage adapted to recharging the first power source or to supplying power to the voltage network. The electrical energy generated by the second power source is therefore converted before reaching the electrical junction.

According to one feature of the invention, the connector is arranged against an external wall of the metal housing and connected to the third set of electrical wires. The connector is external to the metal housing. In this context, in order to be able to connect the connector to the third set of electrical wires, the wall of the metal housing on which the connector is arranged is perforated in order to allow the electrical wires of the third set of electrical wires to pass through the housing.

According to one feature of the invention, the safety means comprise at least one electrical relay, said electrical relay being able to be opened by the control module. The electrical relay is a switch which, when it is opened, blocks the flow of electric current through the corresponding electrical circuit. According to the invention, this relay forming a safety means shared by the two power sources is thus able to completely cut off the flow of electric current within the electric power supply device. The control module, following the detection of an abnormal datum, may therefore cut off the electric current by sending a command to the electrical relay for the latter to open.

According to one feature of the invention, the safety means comprise a plurality of electrical relays which are arranged on each electrical wire in the third set of electrical wires, respectively, and configured to be controlled by a single control module. When the control module controls the electrical relays so as to open, the latter open simultaneously or substantially simultaneously. As there is one electrical relay per electrical wire in the third set of electrical wires, all of the electrical connections between the electric power sources and the connector are cut off in this situation. The control module, following the detection of an abnormal datum, may therefore cut off the electric current by sending a simultaneous command to each of the electrical relays forming the safety means shared by the two power sources. This control module is advantageously housed in the metal housing.

According to one feature of the invention, the electric power supply device comprises at least one temperature sensor connected to the control module, the control module being configured to, on the one hand, compare a temperature measured by the temperature sensor with a maximum temperature threshold and, on the other hand, control the at least one electrical relay depending on the result of the comparison. In other words, the control module is configured to open the one or more electrical relays when the temperature sensor measures a temperature which is above a maximum temperature threshold. The temperature within the metal housing is one of the data which may be considered for causing the electrical relay to open as a safety measure. More particularly, in the event of a fire starting within the metal housing, it is understood that the temperature increases and the temperature sensor will measure this temperature rise. The control module should be able to identify a temperature rise which is representative of a fire starting in opposition to a temperature rise which is representative of the operation of the power sources. To this end, the control module comprises, in a database, a value of a maximum temperature threshold beyond which the heat given off inside the housing must be considered to be a fire starting. The control module is thus configured to compare the measured temperature value with said value of the maximum temperature threshold and, when the temperature within the metal housing is considered to be abnormally high, the control module sends control instructions relating to interrupting the electrical connection by opening the electrical relay.

According to one feature of the invention, the electric power supply device comprises at least one member for calculating insulation resistance connected to the control module, the control module being configured to, on the one hand, compare an insulation resistance value obtained by the calculation member with a minimum insulation resistance threshold and, on the other hand, control the at least one electrical relay depending on the result of the comparison. In other words, the control module is configured to open the one or more electrical relays when the member for calculating insulation resistance calculates an insulation resistance which is below a minimum insulation resistance threshold. The member for calculating insulation resistance is configured to measure an electrical insulation resistance of the metal housing as a whole, without it being necessary to determine the electrical insulation resistance which is specific to each power source and converter which is present in the housing. The means implemented for such a calculation are thus simplified because of the arrangement of the power supply device, and in particular of the various power sources, within the metal housing. If the insulation resistance is too low, that is to say less than the minimum insulation resistance threshold value, then the electric power supply device is considered to be too unsafe to continue operating. The control module then opens the electrical relay.

As an alternative or in addition to what has been described for measuring the temperature and/or calculating the insulation resistance, the control module may rely on other parameters for opening the electrical relay, for example a measurement of an abnormal intensity or voltage by means of suitable measurement units.

According to one feature of the invention, the safety means comprise a pre-charge relay arranged in parallel with the electrical relays. The pre-charge relay makes it possible to anticipate a current draw from the electric motor, for example, and to gradually raise the electric current delivered by the electric power supply device until the electric current intensity required for the optimal operation of the electric motor is reached. The pre-charge relay is thus a safeguard against one and/or the other of the power sources being turned on too suddenly, which may lead to a malfunction of the electric power supply device. It is notable that, according to the invention, the pre-charge relay is arranged on the portion of the electrical circuit which is shared by the two power sources, so that it is not necessary to provide a pre-charge relay for each of the power sources which may be implemented to respond to the current draw from the electric motor.

According to one feature of the invention, the safety means comprise a manual electrical decoupler. The manual electrical decoupler is an alternative for interrupting the electric current to the command carried out by the control module by controlling the at least one electrical relay. The manual electrical decoupler is thus useful in the event of a malfunction of the control module, or indeed, for example, during an external intervention on the vehicle following an accident or a fire in the vehicle.

According to one feature of the invention, the manual electrical decoupler comprises a manual actuator arranged outside the metal housing and one or more switches arranged inside the housing and connected to the manual actuator. The manual actuator may, for example, be a push-button which may be pressed by a user of the vehicle in the event of an emergency, or indeed a person authorized to provide assistance to the users of the vehicle, for example in the event of an accident. The manual actuator may be used to limit the damage which may be caused by the electric power supply device when still turned on, for example after an accident.

According to one feature of the invention, the one or more switches of the manual electrical decoupler are arranged on the third set of electrical wires. Just like the electrical relay, the electrical decoupler must be arranged on the set of wires which are shared by the two power sources in order for the latter to be able to be cut off simultaneously or substantially simultaneously.

According to one feature of the invention, each set of electrical wires comprises at least one passive safety member, the passive safety member arranged on the third set of electrical wires being separate from the safety means shared by the two power sources. "Passive safety member" should be understood to mean that each set of electrical wires includes, for example, a fuse making it possible to automatically cut off the flow of electric current through these sets of electrical wires depending on the state of the one or more components which are associated with this set of electrical wires, and in particular depending on the state of the power sources, for example following a short circuit. The passive safety members thus differ from the aforementioned safety means in that the latter form a single set arranged in a single area of the electrical circuit, namely the set of electrical wires which is shared by the two power sources, which is chosen to be able to cut off any transmission of electric current in the direction of the connector and therefore of the electrical network of the vehicle, and in that the safety means shared by the various power sources are controlled via a control module while the passive safety members are able to trigger automatically in an area which belongs to a power source.

According to one feature of the invention, the first power source is an electric battery and the second power source is a fuel cell. The electric battery is able to store electrical energy and to return it to the voltage network of the vehicle in order to supply power to the latter and thus provide the electric drive of the vehicle. The electric battery may be recharged by connecting the vehicle to an electric terminal adapted to that purpose. The electric battery may also be recharged via an injection of electrical energy delivered by the fuel cell.

The fuel cell generates electrical energy through a chemical reaction between a fuel such as dihydrogen and the oxygen from an air flow. The fuel cell thus forms part of a fuel cell system which in addition comprises a dihydrogen tank and an air supply circuit, as well as pipes making it possible to inject dihydrogen and oxygen within the fuel cell. The fuel cell system may also comprise a cooling circuit. Advantageously, according to one feature of the invention, only the fuel cell is housed in the metal housing of the electric power supply device with the battery, the other components of the fuel cell system being arranged outside the housing.

The invention also relates to an electric or hybrid motor vehicle comprising an electric power supply device as described above.

Figure 2:
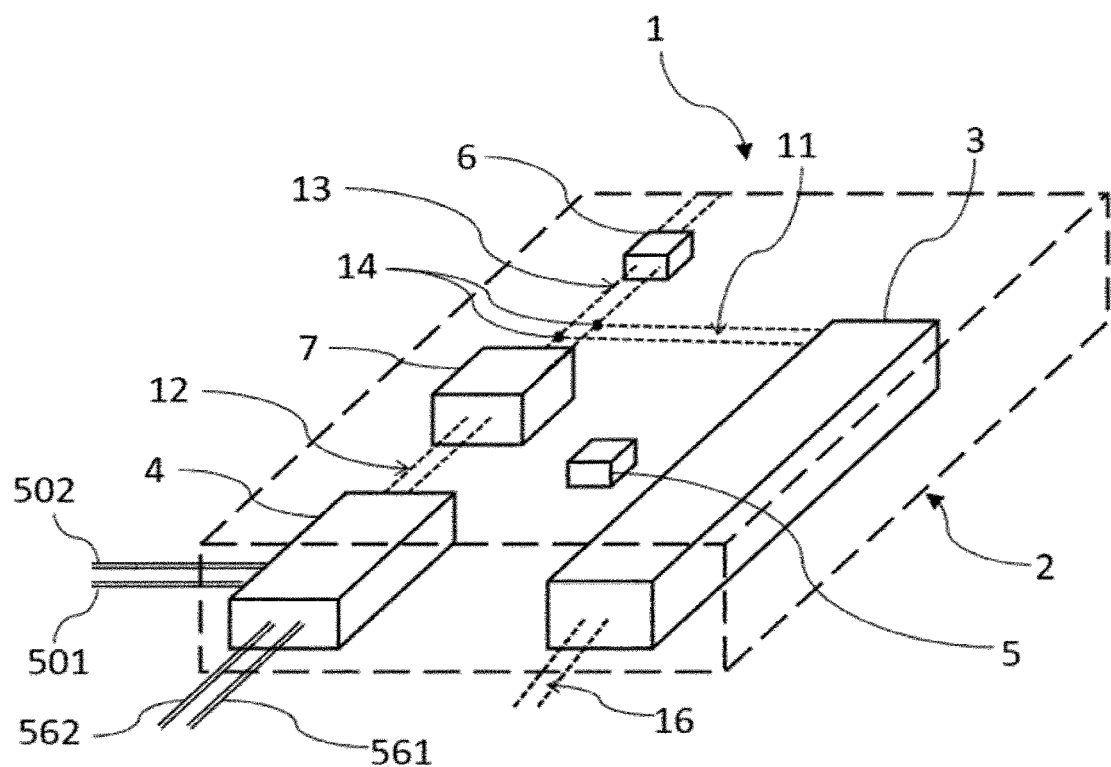
Figure 3:
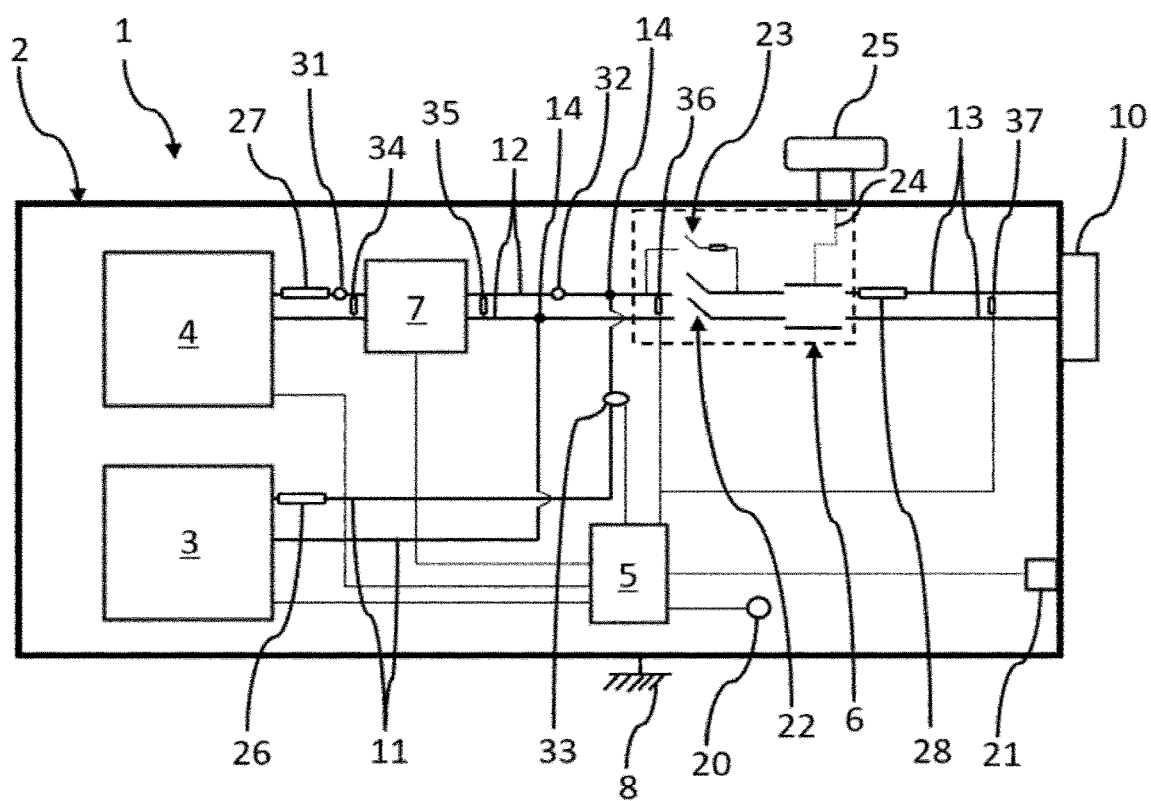

Other features and advantages of the invention will become more apparent from the following description, on the one hand, and from several exemplary embodiments given indicatively and non-limitingly with reference to the appended schematic drawings, on the other hand, in which:

FIG. 1 is a diagram detailing one exemplary arrangement of two power sources of a voltage network of a motor vehicle and for example of an electric motor, FIG. 2 is a schematic representation of an electric power supply device according to the invention, FIG. 3 is a diagram detailing an electrical installation of said electric power supply device.

As has been mentioned, the invention is implemented in the context of an electric or hybrid motor vehicle, with power supply means which are particular in that they make a long range of the vehicle possible by using two different power sources, and this invention relates to the particular arrangement of safety means of these two different power sources, in particular in that safety means 6 shared by the two power sources 3, 4 are provided and housed, in the vicinity of these sources, in a fluid-tight housing 2, within an electric power supply device 1 which will be described in more detail below.

FIG. 1 schematically shows the integration of such an electric power supply device 1 into one exemplary arrangement providing, in particular, a drive of a hybrid or electric vehicle, that is to say comprising at least one voltage network 9 which is able to supply power to an electric motor. The voltage network of the vehicle may be supplied with power by a first power source 3 and/or by a second power source 4. According to the example illustrated in FIG. 1, the first power source 3 is an electric battery, while the second power source 4 is a fuel cell. The two power sources are able at least to transmit electrical energy to the voltage network 9 in order to provide the drive of the vehicle.

The first power source 3 may therefore be in the form of an electric battery which is able to deliver the previously stored electrical energy on demand. When the first power source 3 delivers an electric current intended to supply power to the voltage network 9, said electric current flows within the first set of electrical wires 11 which is connected to the first power source 3, as far as an electrical junction 14. "Set of electrical wires" should be understood to mean one or more electrical wires within which an electric current is able to flow. In the illustrated embodiment, and without this actually limiting the invention, the first set of electrical wires 11, as well as the sets of electrical wires described below, comprise a positive current wire and a ground wire.

In the event that the second power source 4 is a fuel cell, it produces electrical energy through combustion. More specifically, a chemical reaction occurs between a fuel, for example dihydrogen flowing within the dihydrogen circuit 50, and oxygen which may be guided as far as the second power source 4 via an air circuit 56.

The dihydrogen is drawn from a dihydrogen tank 51 and is made to flow by means of a first pump 52 as far as the second power source. In the air circuit 56, a compressor 57 causes the air to flow as far as the second power source 4. The chemical reaction which occurs between the dihydrogen and the air thus makes it possible to generate electrical energy. As such a chemical reaction may give off heat, a cooling circuit 53 flows partially within the second power source 4 in order to maintain a low enough temperature not to cause a malfunction. The cooling circuit 53 comprises a second pump 55 making it possible to make a cooling fluid, for example glycol water, flow, as well as a heat exchanger 54 which makes it possible to discharge the heat energy of the cooling fluid after the latter has accumulated it by passing through the second power source 4.

The second power source 4 is connected to a second set of electrical wires 12. The electrical energy generated by the second power source 4 and leaving the latter therefore flows initially within the second set of electrical wires 12 and passes through an electric converter 7. The electric converter 7 is a DC-to-DC converter which makes it possible to convert the electric current generated by the second power source 4 into a DC electric current adapted to the voltage of the electric current delivered by the first power source 3.

The second set of electrical wires 12 extends, like the first set of electrical wires 11, from the power source which is associated with it as far as the electrical junction 14. It should be noted that the electrical junction 14 is configured so that the electric current flowing within the second set of electric wires 12 as far as the electrical junction 14 after having been converted by the electric converter 7 may then flow within the first set of electrical wires 11 in the direction of the first power source 3, with the aim of recharging this first power source 3. It is therefore understood that the second power source may, according to a first operating mode, supply electric current to the voltage network of the vehicle and the electric motor of the latter and may, according to a second embodiment, supply electric current to the first power source for recharging purposes.

The electric current may also flow within a third set of electric wires 13 extending from the electrical junction 14 and making it possible to guide the electric current generated by the operation of the first power source and/or by the operation of the second power source as far as the voltage network 9. The third set of electrical wires 13 is therefore shared by the two power sources. As has been described above, the two power sources may be used to supply power to the voltage network 9. The electric current emanating from one or other of the power sources may therefore flow within the third set of electrical wires 13 once it has arrived at the electrical junction 14.

In the example illustrated in FIG. 1, the third set of electrical wires 13 makes the electric current flow as far as a first auxiliary converter 62, which is a DC-to-AC converter, thereby supply an AC electric current to the voltage network 9.

In addition, a recharge port 61 is connected to the electrical junction 14 and makes it possible, for example, to recharge the first power source 3 through electrical connection when the vehicle is stationary.

The first power source 3 may also be configured to supply power to an auxiliary battery 64. The latter makes it possible, for example, to supply power to the lighting of a passenger compartment of the vehicle or any other function requiring an injection of electrical energy with the exception of the power supply of the voltage network 9. The voltage network 9 which may supply power to the electric motor, in which the current flows at a high voltage which may be about 400 V, may thus be distinguished from a low-voltage, for example about 12 V, auxiliary network supplied with power by the auxiliary battery. The auxiliary battery 64 is connected to the first power source 3 via a pair of auxiliary electrical wires 16. In order to adapt the electric current to the energy needs of the elements supplied with power by the auxiliary battery 64, a second auxiliary converter 63 is arranged on the pair of auxiliary electrical wires 16, between the first power source 3 and the auxiliary battery 64. The second auxiliary converter 63 is a DC-to-DC converter.

The electric power supply device 1 according to the invention, shown with dotted lines in FIG. 1, will now be described in more detail, in particular with reference to FIG. 2.

More particularly, the electric power supply device 1 comprises the first power source 3, the second power source 4, the electric converter 7, the first set of electrical wires 11, the second set of electrical wires 12, the third set of electrical wires 13 and the electrical junction 14, which are mentioned in FIG. 1.

The electric power supply device 1 also comprises a metal housing 2 which is shown in FIG. 2 with dotted lines, and contains at least the set of elements which is listed above. The metal housing makes it possible, in particular, to centralize the elements of the electric power supply device 1 within the same fluid-tight chamber, connected to the ground of the vehicle.

The arrangement of the two power sources, of the first set of electrical wires 11 and of the second set of electrical wires 12 is identical to what has been described above. It is possible to observe, at the first power source 3, that the pair of auxiliary electrical wires 16 passes through the metal housing 2 so that the auxiliary battery 64 which is visible in FIG. 1 extends outside the metal housing. The latter is arranged so as to allow the pair of auxiliary electrical wires 16 to leave. The same goes for a dihydrogen inlet 501, for a dihydrogen outlet 502, for an air inlet 561 and for an air outlet 562 which pass through the metal housing in order to form a connection with the second power source 4. Thus, it should be noted that, in the case of a second power source formed by a fuel cell, the rest of the components contributing to forming the fuel cell assembly, among which the hydrogen supply system or the cooling system, are not housed in the metal housing and do not here form part of the electric power supply device 1 within the meaning of the invention.

Safety means 6, which are shared by the two power sources 3, 4, are arranged on the third set of electrical wires 13. The electric power supply device 1 comprises a control module 5 authorized to control these safety means 6. The safety means 6 make it possible to interrupt the operation of the electric power supply device 1 by cutting off the flow of the electric current through the third set of electrical wires 13. As the latter is shared by the two power sources as mentioned above, arranging the safety means 6 therein thus makes it possible to share the safety means of the device according to the invention, so that controlling these safety means 6 makes it possible to interrupt the operation of the two power source simultaneously in a single action. This interruption of the operation of the electric power supply device 1 by the safety means 6 therefore occurs faster than in a configuration where the two power sources each possess their own safety means, which must be managed independently of one another.

The control module 5 is able to send a command to the safety means 6 indicating that the flow of electric current within the third set of electrical wires 13 must be interrupted. The sending of this command may, for example, be a consequence of the receipt and/or the detection of an abnormal datum by the control module 5 as will be described below. As the abnormal datum may be indicative of a malfunction of the electric power supply device 1 or of an incident which may cause damage, the function of the safety means 6 controlled by the control module 5 may be preventative or indeed consist in limiting the incidence of potential damage arising following the malfunction of the electric power supply device 1.

The control module 5 and the safety means 6 are also included within the metal housing 2. The latter is fluid-tight in order to avoid an incident initiated within the metal housing 2, for example a fire starting, propagating outside the latter.

FIG. 3 is a detailed schematic representation of an electrical installation of the electric power supply device 1 and makes it possible to structurally and functionally detail the control module 5, the safety means 6 and the interactions between them.

In FIG. 3, the safety means 6 are schematically shown by a rectangle with dotted lines, the elements included within said rectangle being all or part of one of the safety means 6. In the illustrated example, the safety means 6 are in an open position, that is to say that they are in a position such that the electric current can no longer flow within the third set of electrical wires 13 or in the whole of the electrical installation of the electric power supply device 1. Such a configuration may, for example, be due to the activation of said safety means 6. It is understood that, when the electric power supply device 1 is operating normally, with, in particular, a normal flow of current going from one and/or the other of the power sources toward an output connected to the voltage network of the vehicle, the safety means are controlled so as to be closed and be electrically continuous with the electrical wires of the third set 13.

FIG. 3 contributes additional structural features connected with the metal housing 2. It is, in particular, possible to observe that the metal housing comprises a connection to earth 8. The connection to earth 8 may, for example, be indirect, by placing the metal housing 2 within a chassis of the vehicle. The connection to earth 8 makes it possible to discharge any electrical energy which may have propagated in the structure of the metal housing 2.

The electric power supply device 1 also comprises a connector 10, which is not included within the metal housing 2. The connector 10 is arranged against an external wall of the metal housing 2 and is connected to the third set of electrical wires 13. The connector 10 is configured to be connected to the voltage network of the vehicle 9, thereby making it possible to direct the electric current generated by each power source toward said voltage network, as is shown in FIG. 1. In order to provide the connection between the third set of electrical wires 13 and the connector 10, the metal housing 2 may, for example, be configured to allow the third set of electrical wires 13 to pass through its structure.

The safety means 6 comprise at least one electrical relay arranged in the metal housing 2 on a portion of the electrical network shared by the two power sources, and more particularly on the portion of the network between the electrical junction 14 and the connector 10. In the example illustrated in FIG. 3, the safety means comprise two electrical relays 22 controlled simultaneously by the control module, each of the two electrical relays 22 being arranged on one of the two wires in the third set of electrical wires 13. It is, however, possible to integrate only a single electrical relay 22 depending on the configuration of the third set of electrical wires 13. The electrical relays 22 allow the electric current to flow when they are in a closed position, and cut off said flow when they are in an open position, as is illustrated in FIG. 3.

Operating safety, via the interruption of the flow of the electric current, may therefore be achieved by opening these electrical relays 22, said opening being controlled by the control module 5. The latter comprises, in addition, a plurality of means for communication, here wired communication, with several elements of the electric power supply device 1. By virtue of these communication means, the control module 5 may, for example, control an intensity and/or a voltage generated by the first power source 3 or the second power source 4. The control module 5 may also control the safety means 6 as has been mentioned.

The control module 5 is also connected to various measurement and calculation members, among which, here, a temperature sensor 20 and a member for calculating insulation resistance 21. The control module 5 is configured to receive a value measured or calculated by one of these members, and to compare this value with a corresponding threshold value. This threshold value may, in particular, be stored in a memory of the control module. The control module carries out the instructions for controlling the safety means and, for example, opens or does not open the relays, depending on the result of the comparison with respect to these threshold values.

The temperature sensor 20 measures the temperature within the metal housing 2 and transmits said measurement to the control module 5. The measurement of the temperature is useful, for example, in the event of a fire starting within the metal housing 2, which will increase the temperature abnormally. The control module 5 may thus be parametrized so as to open the electrical relays 22 after having received a temperature measurement which is above a maximum threshold temperature, said threshold corresponding to a temperature beyond which the temperature measurement is abnormal.

The member for calculating insulation resistance 21 is connected to the metal housing 2 and makes it possible to measure the insulation resistance of the latter. The member for calculating insulation resistance 21 may, in particular, send an electric current through a circuit including the metal housing and measure the intensity of the electric current which returns to it, in order to deduce therefrom an insulation resistance value for the metal housing 2. The decrease of the insulation resistance of the metal housing 2, which may, for example, be due to wear over time or indeed result from a malfunction of the electric power supply device 1, attests to a risk of current leakage and a danger to the occupants of the vehicle. Also, too low an insulation resistance may, for example, cause electrical damage to an element of the vehicle which is external to the electric power supply device 1, as the metal housing 2 no longer guarantees electrical insulation. The control module 5 may then be configured to open the electrical relays 22 after having received an insulation resistance value which is below a minimum insulation resistance threshold.

The safety means 6 also comprise a pre-charge relay 23 arranged in parallel with one of the electrical relays 22, and more particularly on the positive electrical wire. The pre-charge relay 23, which is associated with a resistor, makes it possible to gradually increase the electric current flowing within the third set of electrical wires 13, for example when the vehicle is started. The pre-charge relay 23 is thus a safeguard against the flow of an electric current which is too intense. Just like the electrical relays 22, the pre-charge relay 23 is shared by the two power sources, here being arranged on the third set of electrical wires, and it is controlled by a command of the control module 5.

The safety means 6 shared by the two power sources according to the invention may also comprise a manual electrical decoupler 24, which comprises a manual actuator 25 which is accessible from outside the metal housing 2. The manual electrical decoupler 24 also makes it possible to interrupt the flow of the electric current within the third set of electrical wires 13, that is to say on the portion of the electrical circuit shared by the two power sources, via one or more switches arranged inside the housing and connected to the manual actuator 24. The manual electrical decoupler 24 is an additional safeguard, for example in the event of a malfunction of the control module 5. The manual actuator 25 may be actuated by a third party, for example during an intervention by the emergency services following an accident.

In order to avoid short-circuit phenomena, the electric power supply device 1 also comprises a first passive safety member 26, a second passive safety member 27 and a third passive safety member 28, which are arranged on the first set of electrical wires 11, the second set of electrical wires 12 and the third set of electrical wires 13, respectively. Each of the passive safety members is able to trigger automatically in order to cut off the flow of the electric current in the set of electrical wires which belongs to it. The passive safety members therefore differ from the safety means 6 which are controlled by the control module.

In order for the control module 5 to be able to manage and adapt the flow of the electric current as well as the intensity and the voltage of the latter, the sets of electrical wires comprise several electrical intensity sensors 31, 32, 33. A first electrical intensity sensor 31 is arranged on the second set of electrical wires 12 between the second power source 4 and the electric converter 7, a second electrical intensity sensor 32 is arranged on the second set of electrical wires 12 between the electric converter 7 and the electrical junction 14, and a third electrical intensity sensor 33 is arranged on the first set of electrical wires 11 between the first power source 3 and the electrical junction 14. In addition, voltage sensors 34, 35, 36, 37 are arranged on the second set of electrical wires 12 between the second power source 4 and the electric converter 7 and between the electric converter 7 and the electrical junction 14, as well as on the third set of electrical wires 13 between the electrical junction 14 and the safety means 6 and between the safety means 6 and the connector 10, respectively.

The set of measurements made by the activated sensors is transmitted to the control module 5, which may then adapt, via the aforementioned, in particular wired, communication means, the operation of the power sources or of the electric converter 7. Said measurements may also be an indicator which may lead the electrical relays 22 to open as a safety measure.

By way of non-limiting example, the intensity measurements made by the electrical intensity sensors 31, 32, 33 may serve to detect a current of an intensity with a value which is higher than the control values, but well below the thresholds for triggering the passive safety members 26, 27, 28, and the control module 5 may then generate a suitable control instruction. For example, a runaway of the charge of the electric converter 7 following a control problem may be detected by the first electrical intensity sensor 31 and this detection may make it possible for the control module 5 to generate an instruction relating to stopping the second power source 4, for example by extinguishing the supply of hydrogen and opening the relays. The third electrical intensity sensor 33 may in the same way detect a current for charging the first power source 3 by means of the second power source 4 which is too high and which requires the second power source 4 and/or the electric converter 7 to be stopped. Equivalently, the monitoring of the voltages by the voltage sensors 34, 35, 36, 37 makes it possible to detect a problem of local overvoltage outside the ranges of normal operation, and in the same way control the operation of the power sources 3, 4, of the electrical energy converter 7 and, if necessary, of the safety means 6.

Of course, the invention is not limited to the examples which have just been described and many modifications may be made to these examples without departing from the scope of the invention, as long as the invention, as it has just been described, proposes an electric power supply device comprising at least two different power sources and safety means shared by said power sources.

The invention claimed is:

1. An electric power supply device for an electric or hybrid motor vehicle, comprising:
  a first power source configured to supply power to a voltage network of the vehicle;
  a second power source configured to supply power to the voltage network of the vehicle and/or recharge the first power source;
  a control module configured to control safety means of the first power source and of the second power source;

a metal housing containing the first power source, the second power source, the control module, and the safety means, said safety means being shared by the two power sources.

2. The electric power supply device as claimed in claim 1, further comprising:
   a first set of electrical wires which is connected to the first power source and a second set of electrical wires which is connected to the second power source, the first set of electrical wires and the second set of electrical wires being connected to one another at an electrical junction; and
   a third set of electrical wires which are shared by the two power sources and extend from the electrical junction in the direction of a connector configured to be connected to a voltage network of the vehicle, the safety means being arranged on the third set of electrical wires.

3. The electric power supply device as claimed in claim 2, in which the safety means comprise a plurality of electrical relays which are arranged on each electrical wire in the third set of electrical wires, respectively, and configured to be controlled by a single control module.

4. The electric power supply device as claimed in claim 3, in which the safety means comprise a pre-charge relay arranged in parallel with the electrical relays.

5. The electric power supply device as claimed in claim 1, in which the safety means comprise a manual electrical decoupler.

6. The electric power supply device as claimed in claim 5, in which the manual electrical decoupler comprises a manual actuator arranged outside the metal housing and one or more switches arranged inside the housing and connected to the manual actuator.

7. The electric power supply device as claimed in claim 2, in which the safety means comprise a manual electrical decoupler,
   in which the manual electrical decoupler comprises a manual actuator arranged outside the metal housing and one or more switches arranged inside the housing and connected to the manual actuator, and
   in which the one or more switches of the manual electrical decoupler are arranged on the third set of electrical wires.

8. The electric power supply device as claimed in claim 2, in which each set of electrical wires comprises at least one passive safety member, the passive safety member arranged on the third set of electrical wires being separate from the safety means shared by the two power sources.

9. The electric power supply device as claimed in claim 1, in which the first power source is an electric battery and the second power source is a fuel cell.

10. An electric or hybrid motor vehicle comprising:
    an electric power supply device as claimed in claim 1.

* * * * *